United States Patent [19]

Ebata et al.

[11] 4,279,701
[45] Jul. 21, 1981

[54] SHIELD WALL FOR SURROUNDING REACTOR CONTAINMENT VESSEL FOR NUCLEAR REACTOR AND METHOD FOR CONSTRUCTING THE SAME

[75] Inventors: Sakae Ebata; Masahide Watari; Sunao Hayakumo; Osamu Oyamada, all of Hitachi, Japan

[73] Assignee: Hitachi, Ltd., Tokyo, Japan

[21] Appl. No.: 911,076

[22] Filed: May 31, 1978

[30] Foreign Application Priority Data

Jun. 1, 1977 [JP] Japan .................................. 52-64437

[51] Int. Cl.³ ............................................. G21C 9/00
[52] U.S. Cl. ......................................... 176/87; 176/38
[58] Field of Search .................................. 176/38, 87

[56] References Cited

U.S. PATENT DOCUMENTS

| 3,421,977 | 1/1969 | Hutchinson et al. | 176/87 X |
| 3,776,814 | 12/1973 | Lockett et al. | 176/87 |
| 3,881,288 | 5/1975 | Fay | 176/87 |
| 3,945,887 | 3/1976 | Lemercier | 176/87 |
| 3,975,879 | 8/1976 | Birch et al. | 176/87 X |
| 4,022,658 | 5/1977 | Gama et al. | 176/87 X |
| 4,055,464 | 10/1977 | Lemercier | 176/87 |
| 4,055,465 | 10/1977 | Lemercier | 176/87 |
| 4,112,648 | 9/1978 | Suzuki et al. | 176/87 X |

FOREIGN PATENT DOCUMENTS

| 701713 | 1/1965 | Canada | 176/87 |
| 1929027 | 10/1970 | Fed. Rep. of Germany | 176/87 |
| 1965849 | 7/1971 | Fed. Rep. of Germany | 176/87 |
| 2451448 | 5/1975 | Fed. Rep. of Germany | 176/87 |
| 2300401 | 8/1976 | France | 176/87 |
| 2316704 | 4/1977 | France | 176/87 |

OTHER PUBLICATIONS

Translation of French Pat. No. 1408372.

Primary Examiner—Peter A. Nelson
Attorney, Agent, or Firm—Craig and Antonelli

[57] ABSTRACT

A reinforced concrete shield for a nuclear reactor and a method for constructing the same. The interior surface of the concrete shield wall is lined with a layer of heat insulator.

9 Claims, 7 Drawing Figures

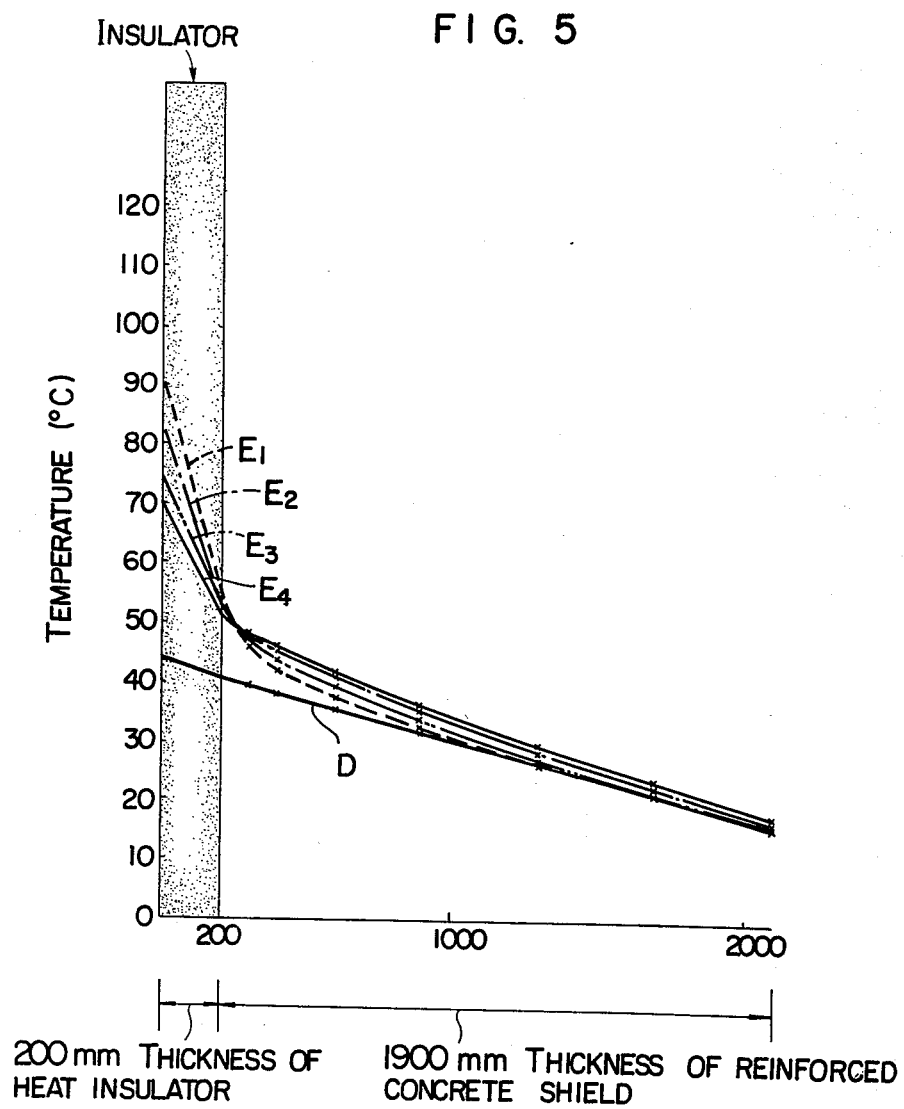

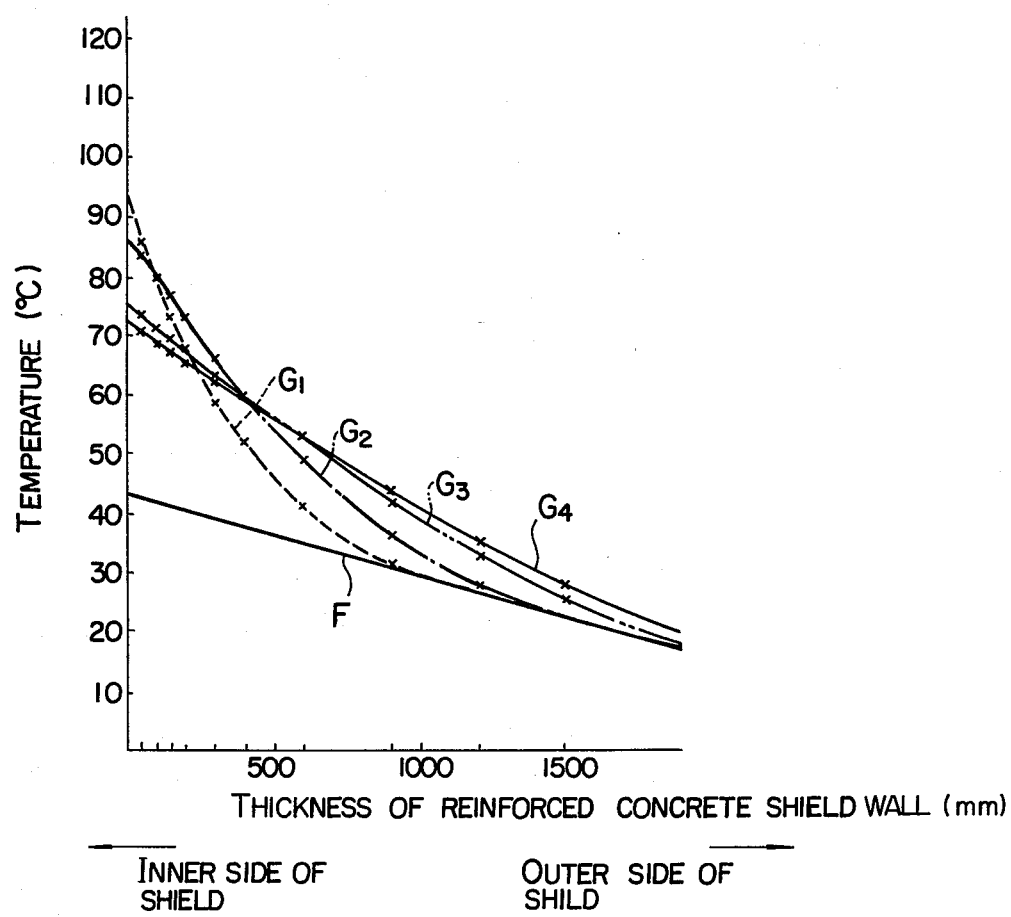

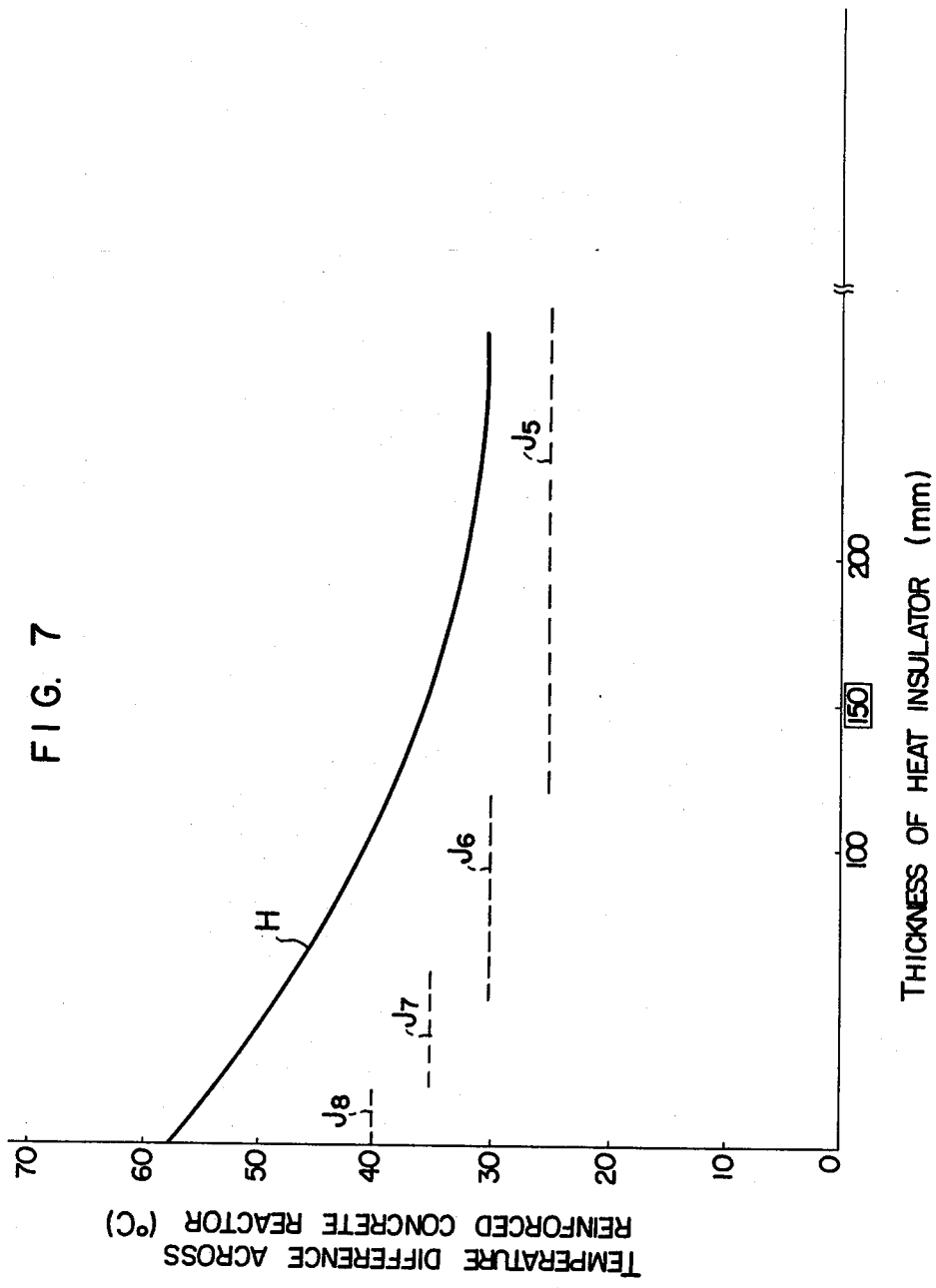

SHIELD WALL FOR SURROUNDING REACTOR CONTAINMENT VESSEL FOR NUCLEAR REACTOR AND METHOD FOR CONSTRUCTING THE SAME

LIST OF PRIOR ART REFERENCES (37 CRF 1.56(a))

The following references are cited to show the state of the art:
Japanese Patent Publication No. 19117/76
  Appln. Date: Oct. 29, 1971
  Publn. Date: June 15, 1976
Japanese Patent Publication No. 29278
  Appln. Date: Dec. 29, 1971
  Publn. Date: Aug. 24, 1976

BACKGROUND OF THE INVENTION

The present invention relates to generally a wall construction capable of withstanding the forces caused by heat and pressure and a method for constructing the same and more particularly a reinforced concrete shield wall for surrounding reactor containment vessel for a nuclear power station and a method for constructing the same and has for its object to increase the resistance of the concrete shield wall against heat and/or pressure and to provide an improved method for constructing the same.

It has been well known in the art to line the exterior surface of a pressure vessel with a heat insulator such as glass fiber, rock wool or the like in order to minimize the heat dissipation from a reactor core or a nuclear thermal source, thereby improving the thermal efficiency.

The present invention relates to a reinforced concrete shield wall surrounding a reactor containment vessel, the interior surface of the concrete shield wall being lined with a heat insulator in order to attain the effects different from those attained by lining the exterior surface of the pressure vessel.

A reactor building biological shield wall (concrete shield wall) is in general spaced apart from a reactor containment vessel by approximately 50 mm and is designed so as to withstand the sudden temperature and pressure rise resulting from the loss of part or the whole of the coolant due to a rupture in the coolant system in the reactor system. In case of a failure of the coolant system the heat is more critical than the pressure with the civil design. In order to withstand the thermal stresses the concrete shield wall is reinforced with steel rods or bars. For instance, in case of a concrete shield wall thickness of approximately 1900 mm, longitudinal reinforcements such as longitudinal steel bars or the like are arrayed in three coaxial circles spaced radially from each other by 200 mm and the longitudinal reinforcements in each circle are circumferentially spaced apart from each other by 200 mm.

Adjacent to or interconnected to each of the circles of the longitudinal reinforcements, horizontal reinforcements such as horizontal steel bars or the like which are vertically spaced apart from each other by about 200 mm are also arranged. Of three circles of longitudinal reinforcements, two circles together with the horizontal reinforcements are arranged in order to withstand the thermal stresses while the remaining circle having the horizontal reinforcements is arranged in order to absorb the shocks in case of an earthquake and the weight of the concrete shield wall. Both the longitudinal steel reinforcements and the horizontal steel reinforcements are approximately 38 mm in diameter (D38). The three circles of longitudinal reinforcements are located adjacent to both sides of the interior and exterior wall surfaces. That is, the total of six circles of longitudinal reinforcements and the horizontal reinforcements associated therewith are embedded in the concrete shield wall.

The longitudinal reinforcements serve as resistance members to protect the shield wall from tension loads when acting in the longitudinal direction, and the horizontal reinforcements resist tension loads in the circumferential direction.

These longitudinal and horizontal reinforcements make a complex space structure which restricts the flow of concrete upon placing, especially the aggregate in the concrete flow.

Thus, complicated reinforcements cause problem when pipes and holes are made to pass through the shield wall.

SUMMARY OF THE INVENTION

One of the objects of the present invention is to increase the resistance to heat and pressure of a reinforced concrete shield wall.

Briefly stated, to the above and other ends the present invention provides a reinforced concrete shield wall the interior surface of which is lined with a layer of heat insulator.

BRIEF DESCRIPTION OF THE DRAWINGS

FIG. 5 shows a temperature distribution or gradient across a reinforced concrete shield wall lined with a layer of heat insulator in accordance with the present invention;

FIG. 6 shows a temperature distribution or gradient across a conventional reinforced concrete shield wall; and FIG. 7 shows the relationship between the thickness of a layer of heat insulator on the one hand and the temperature difference across a reinforced concrete shield wall and the amount of reinforcing steel on the other hand.

DETAILED DESCRIPTION OF THE PREFERRED EMBODIMENT

Figure 1:
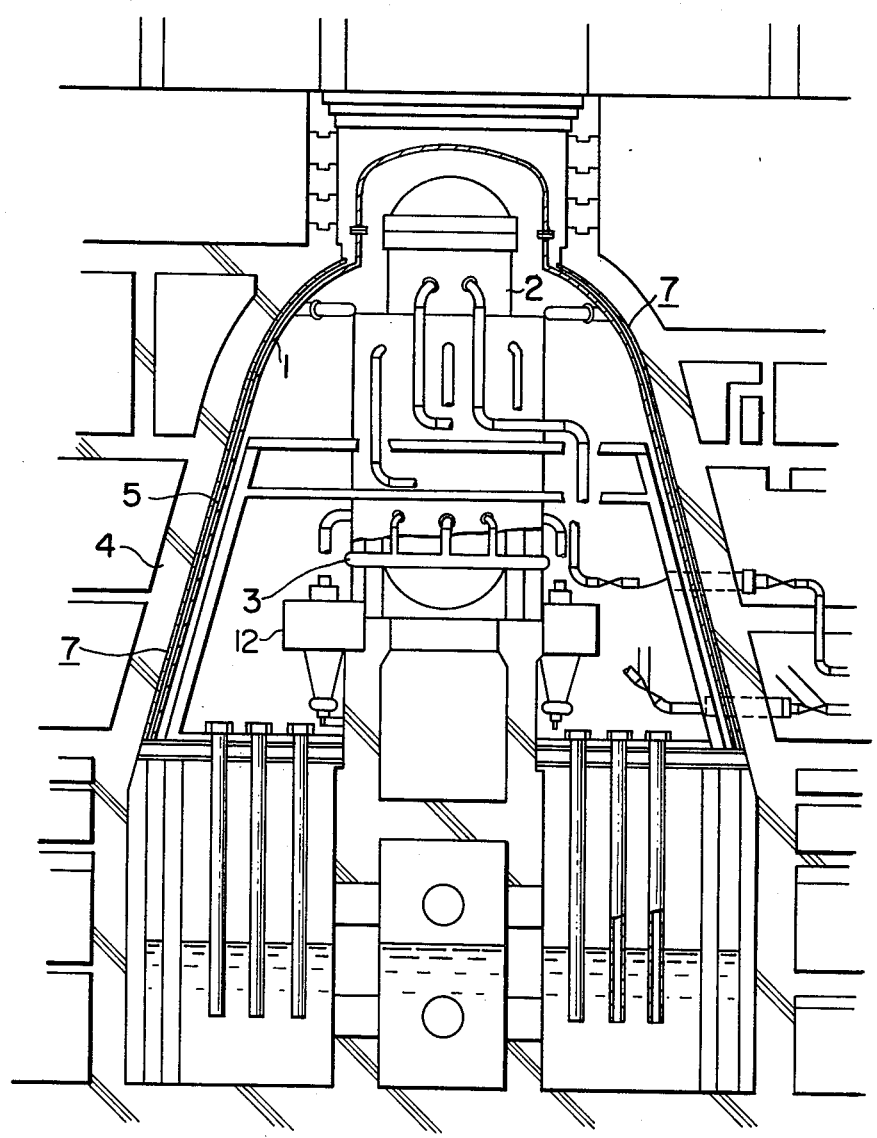
FIG. 1 is a fragmentary schematic view of a nuclear power station including an insulated reinforced shield wall construction according to the present invention.

Referring first to FIG. 1, a reactor containment vessel 1 which encloses a reactor core 2, primary reactor machinery (recycle pump system etc.) 12 and a primary coolant circulation system 3 is in turn surrounded completely with a space 5 with a width of approximately 50 mm and with a biological shield 4. The interior surface of the shield 4 is lined with a layer 50 to 250 mm in thickness of heat insulators 7 which are glass or rock wool or the like packed with an incombustible packing material 8 such as steel or stainless steel in the form of a box and which will be referred to as "the heat insulator blocks" hereinafter.

Figure 2:
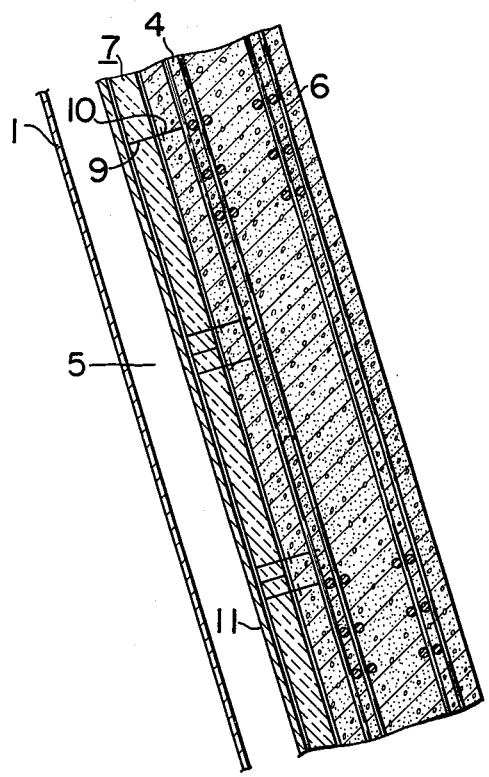
FIG. 2 is a fragmentary sectional view of a reinforced concrete shield wall in accordance with the present invention.

Referring to FIG. 2, the method for lining the interior surface of the shield 4 with the heat insulator blocks 7 will be described in detail. The insulator blocks 7 are mounted with suitable joint means such as bolts 9 and nuts 10 on a supporting structure 11 which is spaced apart from the reactor containment vessel 1 by a suitable distance. The supporting structure 11 may be in the form of a shell consisting of steel or stainless steel plates welded together or may be in the form of a assembled framework consisting of shape steels. The shell-shaped supporting structure 11 is advantageous in that it may serve as a secondary containment vessel located next to the reactor containment vessel 1 so that more secure air-tightness of the reactor containment or shield system may be ensured. In case of the framework structure, these insulator blocks 7 which are mounted on the upper part of the framework assembly are preferable to securely interconnected to each other and joined to the assembly in such a way that they may serve as forms for placing concrete. In case of the shell-shaped supporting structure 11, the heat insulator blocks 7 also serve as forms or frameworks, but it is not necessary to give increased supporting strength to the heat insulator blocks 7 because the shell-shaped supporting structure 11 may inherently bear against heavy load of the placed concrete.

Figure 3:
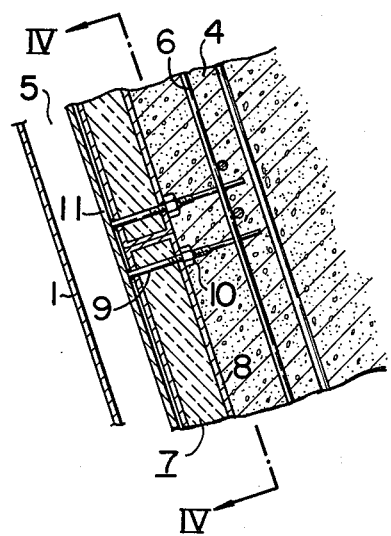
FIG. 3 is a fragmentary sectional view, on enlarged scale, thereof.
Figure 4:
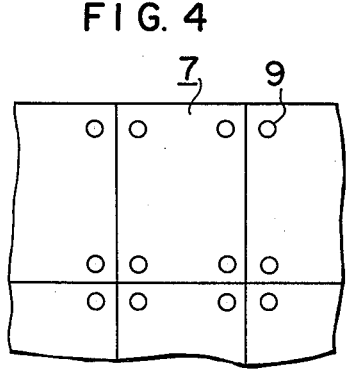
FIG. 4 is a view showing an arrangement of heat insulation blocks.

FIG. 3 shows in more detail the method for mounting the heat insulation blocks 7 on the supporting structure 11 and FIG. 4 shows the array of the heat insulator blocks 7. In FIGS. 2 and 3, the reference numeral 6 denotes a longitudinal reinforcing steel bar or the like in the concrete shield wall 4.

The method for constructing the concrete shield wall 4 in accordance with the present invention will be described with reference to FIGS. 1-4. The heat insulation block supporting member 11 in the form of a shell or a steel framework assembly is constructed around the reactor containment vessel 1 and spaced apart therefrom by about 50 mm as described above. Thereafter studs or bolts are welded to or driven into the supporting structure 11 in a spaced apart relationship. The term "driving" refers to driving the stud or bolt into a hole in the supporting structure 11. In FIGS. 2 and 3, the studs 9 are welded to the shell-shaped or assembled supporting structure 11. These studs or bolts 9 are so arrayed on the supporting structure 11 as to be in line with the mounting holes of the heat insulation blocks 7 (In FIG. 4, these mounting holes are located at the corners). After the studs or bolts 9 have been inserted into the mounting holes of the heat insulation blocks 7, the nuts 10 are screwed on the bolts or studs 9 so as to firmly secure the heat insulation blocks 7 on the supporting structure 11 as shown in FIG. 4.

After the heat insulation blocks 7 have been securely mounted on the supporting structure 11 in the manner described above, the forms are assembled opposite to the heat insulation blocks to define a space of placing concrete. And, the reinforcing steel bars or the like 6 are assembled in the conventional manner, and the concrete is placed. Both the studs or bolts 9 and the reinforcements 6 are embedded in the concrete and the heat insulator blocks 7 may be securely bonded to the concrete.

Next referring to FIGS. 5 and 6, the effects of the heat insulation blocks 7; that is, the temperature distribution or gradient in the concrete shield 4 will be described. FIG. 5 shows the temperature distribution or gradient in the concrete shield wall 4 when the thickness of the heat insulation blocks 7 excluding the thickness of the packing material 8 is 200 mm. The temperature is plotted along the ordinate while the distance from the interior surface of the heat insulation blocks is plotted along the abscissa with N being the thickness (200 mm) and, M is the thickness of the concrete shield wall 4. The line curve D shows the temperature distribution or gradient in case of the normal operation. The curves $E_1$ through $E_4$ show the temperature distributions or gradient about 25 hours, about 60 hours, about 125 hours and about 180 hours after the accident has occured with the resulting increase in both temperature and pressure within the reactor containment vessel 1.

In like manner, FIG. 6 shows the temperature distribution or gradient of a conventional concrete shield not lined with the heat insulator blocks 7. The curve F shows the temperature distribution or gradient in case of the normal operation, and the curves $G_1$ through $G_4$, those about 25 hours, about 60 hours, 125 hours and about 180 hours, respectively, after the shutdown due to an accident.

From FIG. 5 it can be seen that in case of the normal operation, the temperature gradually decreased at a low gradient from the interior surface of the concrete shield wall as indicated by the curve F, but in case of the accident the temperature gradient becomes very steep as indicated by the curves $G_1$ through $G_4$ so that the concrete shield is subjected to severe strain and thermal stress. However, when the heat insulation blocks 7 are lined in the manner described above, the temperature distribution after the accident; that is, the curves $E_1$–$E_4$ are not so deviated from the temperature distribution or the curve D in case of the normal operation as shown in FIG. 5. That is, regardless of the abnormal temperature rise in the reactor containment vessel 1 due to the accident, the interior surface (that is, the surface in contact with the heat insulation blocks 7) of the concrete shield wall 4 may be maintained at a relatively low temperature as compared with the concrete shield without no heat insulation lining, and the temperature in the concrete shield wall 4 gradually decrease uniformly at a low gradient so that the temperature difference between the interior and exterior surfaces of the concrete shield wall 4 is only slightly greater than the temperature difference in case of the normal operation.

In FIG. 7, the curve H shows the relationship between the thickness in mm of the heat insulator block and the temperature difference across the concrete shield wall. The thickness is plotted along the abscissa while the temperature difference in °C., along the ordinate. The curve H is for rock wool heat insulator. From FIG. 7, it can be seen that the lining of the interior surface of the concrete shield wall 4 with the heat insulation blocks 7 results in the decrease in the temperature difference across the concrete shield wall 4 and a gentle temperature gradient. It can be also seen that when the thickness of the heat insulation block 7 exceeds 200 mm, the curve becomes almost flat.

Because of the gentle temperature gradient or temperature difference across the concrete shield wall 4 which may be attained by the lining of the interior surface of the shield wall 4 with the heat insulation blocks 7, the number of longitudinal reinforcements such as steel bars or the like 6 may be decreased. In other words, the lining of the interior surface of the concrete shield wall 4 with the heat insulation blocks 7 results in the increase in thermal resistance of the shield wall 4. FIG. 7 also shows the relation between the thickness of the heat insulator and the number of longitudinal reinforcements. That is, the subscripts of $J_8$, $J_7$, $J_6$ and $J_5$ each shows the number of longitudinal reinforcements required per one meter of circumferential length of the shield wall 4 in order to attain the desired resistance against the thermal stresses, and the length of each broken line indicates the required thickness of the heat insulator. For instance, when the temperature difference across the concrete shield wall 4 is about 38° to 48° C., six longitudinal reinforcements such as steel bars or the like are required as indicated by $J_6$. As has been described elsewhere the longitudinal bas are circumferentially spaced apart from each other by about 200 mm so that the maximum allowable number of steel bars is five per meter of the wall. Therefore, when reinforcing steel bars in excess of five are required, they are arrayed along a first circle at a pitch of 5 per meter of the wall, and the remaining steel bars are arrayed along a second circle outwardly of the first circle and circumferentially spaced apart by a suitable distance. That is, when more than 6 (6 inclusive) and less than ten (10 inclusive) steel bars are required per meter of the wall, the longitudinal steel bars are arrayed along two coaxial circles and interconnected with each other through ties. In addition, in order to safegurad the shield wall against the shocks of the earthquake and the weight of the shield wall, a third circular array of longitudinal reinforcing steel bars or the like is required. In other words, in order to attain the sufficient resistance against the thermal stresses with about one circular array of longitudinal reinforcements, the thickness of the heat insulator must be equal to at least the length indicated by for instance $J_5$, that is, about 120 mm. The thermal insulation effect remains almost unchanged after the thickness of the heat insulator exceeds 200 mm as indicated by the curve H in FIG. 7. Thus, according to the present invention, only two circular arrays of longitudinal reinforcing steel bars or the like are required, one being for reinforcing the concrete shield against the thermal stresses and the other for reinforcing against the shocks of the earthquake and the weight of the shield concrete. More particularly, when the same number of longitudinal reinforcing bars are used in both the concrete shield walls of the prior art and the present invention, the strength of the concrete shield wall in accordance with the present invention can be increased to such an extent which could be obtained by increasing the number of reinforcements by about 30%. In order words, the number of required longitudinal reinforcements may be reduced by about 30%. As a result, even though the additional step for lining the interior surface of the concrete shield wall with the heat insulation blocks is required, the construction of the concrete shield may be much facilitated because the works for assembling reinvorcements may be considerably reduced as described above.

We claim:

1. In a reinforced concrete shield wall for surrounding a nuclear reactor container enclosing therein a nuclear reactor vessel with a nuclear reactor core, said reinforced concrete shield wall being spaced apart from said reactor container, an improvement comprising:

a supporting structure constructed between said reactor container and the interior surface of said reinforced concrete shield wall and spaced apart from said reactor container, a plurality of heat insulation blocks interposed between said supporting structure and the interior surface of said reinforced concrete wall to form an insulation layer, the plurality of heat insulation blocks being supported by said supporting structure and an exterior surface of the insulation layer formed by said plurality of heat insulation blocks contacting the interior surface of said reinforced concrete shield wall, and retaining means for securely retaining said heat insulation blocks between said supporting structure and said reinforced concrete shield wall.

2. An improvement as set forth in claim 1, wherein each of said heat insulation blocks is in the form of a box having an outer shell of a rigid material.

3. An improvement as set forth in claim 1, wherein each of said heat insulation blocks is in the form of a plate having an outer envelope.

4. An improvement as set forth in claim 1, wherein said supporting structure is in the form of an air-tight shell surrounding said reactor container.

5. An improvement as set forth in claim 1, wherein said supporting structure comprises a framework assembly of shaped steel members.

6. An improvement as set forth in claims 1, 2, 3 or 4, wherein said retaining means are bolts fixed to said supporting structure.

7. An improvement as set forth in claims 1, 2, 3 or 4, wherein said retaining means are studs fixed to said supporting structure.

8. An improvement as set forth in claim 6, wherein one end of each bolt at one side opposite to said supporting structure is fixed to said reinforced concrete shield wall.

9. An improvement as set forth in claim 7, wherein one end of each stud at one side opposite to said supporting structure is fixed to said reinforced concrete shield wall.

* * * * *